United States Patent
Jensen et al.

(10) Patent No.: US 8,515,493 B1
(45) Date of Patent: Aug. 20, 2013

(54) ANTENNA ARRAY FORMED BY A NETWORK OF TRANSCEIVERS

(75) Inventors: Dana J. Jensen, Marion, IA (US); Fatma A. Sakarya, Marion, IA (US); Scott J. F. Zogg, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 2031 days.

(21) Appl. No.: 11/153,597

(22) Filed: Jun. 15, 2005

(51) Int. Cl.
H04M 1/00 (2006.01)

(52) U.S. Cl.
USPC ............ 455/562.1; 455/562.2; 455/422; 455/447; 455/424; 455/562; 370/328; 370/338; 370/255; 370/335; 370/342; 342/371; 342/372; 342/373; 342/374; 342/377

(58) Field of Classification Search
USPC ........... 455/562, 561, 129, 447, 422, 424; 370/338, 328, 255, 335, 342; 375/145, 347; 342/371–374, 377
See application file for complete search history.

(56) References Cited

U.S. PATENT DOCUMENTS

| | | | | |
|---|---|---|---|---|
| 6,642,887 B2 * | 11/2003 | Owechko | | 342/373 |
| 6,816,116 B2 * | 11/2004 | Chen | | 342/372 |
| 2001/0033248 A1 * | 10/2001 | Owechko | | 342/371 |
| 2002/0106041 A1 * | 8/2002 | Chang et al. | | 375/347 |
| 2002/0132643 A1 * | 9/2002 | Chang et al. | | 455/562 |
| 2002/0181427 A1 * | 12/2002 | Sparr et al. | | 370/338 |
| 2003/0156061 A1 * | 8/2003 | Ohira | | 342/372 |
| 2006/0040708 A1 * | 2/2006 | Steele et al. | | 455/562.1 |
| 2006/0128436 A1 * | 6/2006 | Doi et al. | | 455/562.1 |
| 2006/0291537 A1 * | 12/2006 | Fullerton et al. | | 375/145 |
| 2008/0075033 A1 * | 3/2008 | Shattil | | 370/328 |

OTHER PUBLICATIONS

"Researchers Jam More Data Through the Pipes"; Henry S. Kenyon, Signal Magazine, Jun. 2004.
"Mobile Network MIMO=MNM", MNM Bidder's Meeting, Dr. James A. Freebersyser, DARPA/ATO, Jun. 25, 2003.

* cited by examiner

*Primary Examiner* — Kiet Doan
*Assistant Examiner* — Michael T Vu
(74) *Attorney, Agent, or Firm* — Donna P. Suchy; Daniel M. Barbieri

(57) ABSTRACT

An antenna array is formed by a network of transceivers that includes unit radios and a command radio. The command radio configures the antenna array and communicates with the unit radios to send and receive signals. The unit radios may form an antenna array with greater than half-wavelength spacing and the command radio receives signals from another radio through a unit radio receiving a best signal or from combined signals from several unit radios received from the other radio. The unit radios may form an antenna array having half wavelength or less spacing that forms a digital beam forming antenna with an antenna grid to which the unit radios are connected.

27 Claims, 3 Drawing Sheets

ANTENNA ARRAY FORMED BY A NETWORK OF TRANSCEIVERS

BACKGROUND OF THE INVENTION

The present invention relates to communications systems and specifically to a communications system that utilizes transceivers as elements in an antenna network array.

DARPA has expressed interest in mobile ad-hoc networks (MANET). A more specific area of interest is a directional MANET that makes use of directional antennas in a network. There is a DARPA challenge related to a multiple-input multiple-output (MIMO) directional MANET that will afford the war fighter better communication in specific operational scenarios as well as providing a means of cooperative weapon processing through wireless data links.

Directional networks offer significant advantages over non-directional networks. These advantages include improved data rates, reduced observability, greater spectral reuse, and better immunity to intentional and unintentional interference. Directional networks also offer operational capabilities that include scalability and re-configurability to adapt to changing wireless link quality and implementation platforms. Today, however, transceivers used in directional networks are frequently limited in size. The transceivers also often require side information on participant location, due to the difficulty of locating and tracking network participants for example through a narrow aperture. As a result, adding to the number of network users comes with additional cost. Implementing direction finding through sensor arrays with narrow beams requires a significantly large number of sensors and the associated transceiver hardware, which is not physically practical for general MANET applications such as a network of soldier hand-held units.

What is needed is a practical solution for a directional networked array utilizing individual node transceivers to form a networked sensor array supported by signal processing and a data link.

SUMMARY OF THE INVENTION

A network array comprising a plurality of unit radios and a command radio located with the plurality of unit radios that operate to form an antenna array is disclosed.

Each radio in the plurality of unit radios may be separated at greater than half-wavelength spacing and the command radio uses collective receiver capabilities of the plurality of unit radios to establish communications with another radio. The command radio may listen to a best signal received by a unit radio in the plurality of unit radios from the other radio. The command radio may combine signals received by the plurality of unit radios from the other radio.

Each radio in the plurality of unit radios may be separated at a half-wavelength or less separation to form the network array as a digital beam forming antenna. An antenna grid has the plurality of unit radios connected to it and the grid is set up to ensure half-wavelength or less spacing of the plurality of radios.

The plurality of unit radios in the network array may be synchronized. The plurality of unit radios may be synchronized by having one of a common local oscillator and digital clock, a common reference clock, and stable reference clocks in the plurality of unit radios. The stable reference clocks are synchronized at the start of a mission and are periodically updated by the command radio. The network array is synchronized to determine frame timing with one of a common reference clock and stable reference clocks in the plurality of unit radios. The stable reference clocks may be fly-wheeling and require an initialization reference when synchronized to other unit radios. The network array may use a time-based access structure and the common reference clock used to determine frame and slot positions in time.

The network array may use spread spectrum and chip periods may be synchronized to reduce loss of orthogonality. Frame-based transmissions may occur and the common reference clock is used for the plurality of unit radios to frame- and chip-align operation. The command radio may collect frame data from the plurality of unit radios simultaneously.

The command radio may configure the network array by communicating with the plurality of unit radios to send to and receive baseband samples or soft decisions from the plurality of unit radios. A separate link may be used for the unit radios to send the baseband samples or soft decisions to the command radio when the plurality of unit radios simultaneously transmit and receive signals to and from the network array.

The unit radios may only be used for receiving signals sent to the network array and their transmitters are used to pass the baseband samples or soft decisions to the command radio.

The command radio may send its baseband samples or soft decisions to the plurality of unit radios that use their receivers to receive the baseband samples or soft decisions and their transmitters to send the baseband samples or soft decisions from the network array.

It is an object of the present invention to provide a mobile ad hoc network.

It is an object of the present invention to provide a directional network.

It is an advantage of the present invention to provide improved data rates, reduced observability, greater spectral reuse, and better immunity to intentional and unintentional interference.

It is an advantage of the present invention to provide scalability and re-configurability.

It is a feature of the present invention to provide better communications in operational scenarios.

It is a feature of the present invention to provide a practical solution for a directional networked array utilizing individual node transceivers to form a networked sensor array supported by signal processing and a data link.

BRIEF DESCRIPTION OF THE DRAWINGS

The invention may be more fully understood by reading the following description of the preferred embodiments of the invention in conjunction with the appended drawings wherein.

DETAILED DESCRIPTION

The invention described herein is for an antenna array formed by utilizing individual transceivers to form a network array. The network array may be supported by signal processing and a data link.

The use of multi-element antenna arrays to enhance communications is a topic of intense research. Multi-element antenna arrays are connected to transceivers integrated to a single processor to benefit from digital beam forming (DBF) or space-time algorithms. Two common types of spacing for elements of antenna arrays are greater than half-wavelength and typically multiple wavelength spacing for space-time diversity and less than or equal to half-wavelength spacing for DBF.

MIMO processing often implies antenna elements of an array having multiple wavelength separation. The objective is to encourage and make use of independent multipath propagation to create parallel channels in the same band. Multipath decorrelates signals creating the parallel channels thereby increasing system capacity. When an array is used to receive from a single transmit antenna, the special case of MIMO is referred to as single-input multiple-output (SIMO). SIMO is essentially used to increase the number of independent fading paths over which the signal is received; it is a form of receiver diversity.

DBF often implies that antenna elements be arranged in an array with less than or equal to half-wavelength separation. With this separation, the signals are spatially sampled as well as sampled in time. DBF techniques with this type of configuration can be used to shape the antenna pattern to provide directional gain and/or null positioning. Beam forming can also be accomplished with greater than half-wavelength spacing but a multi-lobe antenna pattern results due to grating lobes.

In the present invention a group of individual transceivers is arranged in an ad hoc network to form an antenna array that is referred to hereinafter as a network array. Each transceiver is an element in the network array. This network array attains some of the benefits of a dedicated transceiver array, namely, MIMO processing and/or DBF.

With the present invention a unit of soldiers may assemble their transceivers into the network array to improve communications beyond that possible with any individual transceiver. This may be an important advantage when range or low'probability of intercept/low probability of detection (LPI/LPD) is of concern.

Figure 1A:
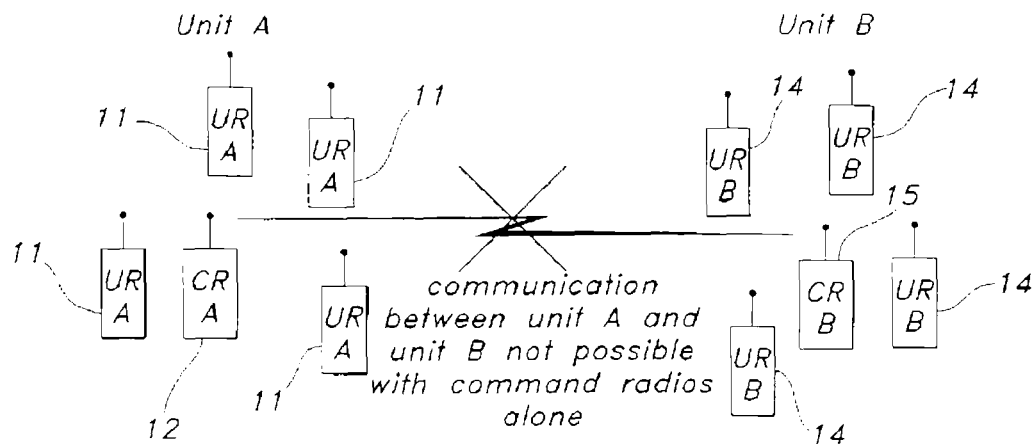
FIG. 1a show two units with unit radios scattered over an area with widely varying propagation conditions that are unable to communicate using command radios alone.

In FIG. 1a two units, A and B, are scattered over an area with widely varying propagation conditions, such as a rough terrain or an urban setting. A commander of unit A must communicate with a commander of unit B. Each soldier in unit A has a transceiver referred to as a unit radio A (URA) 11. Unit A commander has a transceiver referred to as a command radio A (CRA) 12. Likewise each soldier in unit B has a unit radio B (URB) 14 and unit B commander has a command radio B (CRB) 15. Both commanders have their own unit members within LPI/LPD communications range, but a communications link cannot be set up between the commanders' radios CRA 12 and CRB 15 due to the rough terrain or the urban setting.

The unit radios and command radios may be transceivers as described above. In certain embodiments described below, certain unit radios and command radios may be used only for receiving and the unit radios and command radios may then be receivers instead of transceivers. Likewise, certain unit radios and command radios may be used only for transmitting and the unit radios and command radios may then be transmitters instead of transceivers.

In FIG. 1a, if many or all radios in unit A are transmitting and many or all radios in unit B are receiving, this condition is referred to as multiple-input multiple-output (MIMO). If many or all radios in unit A are transmitting and one radio in unit B is receiving, this condition is referred to as multiple-input single-output (MISO). If one radio is transmitting in unit A and many or all radios in unit B are receiving, this condition is referred to as single-input multiple-output (SIMO).

Figure 1B:
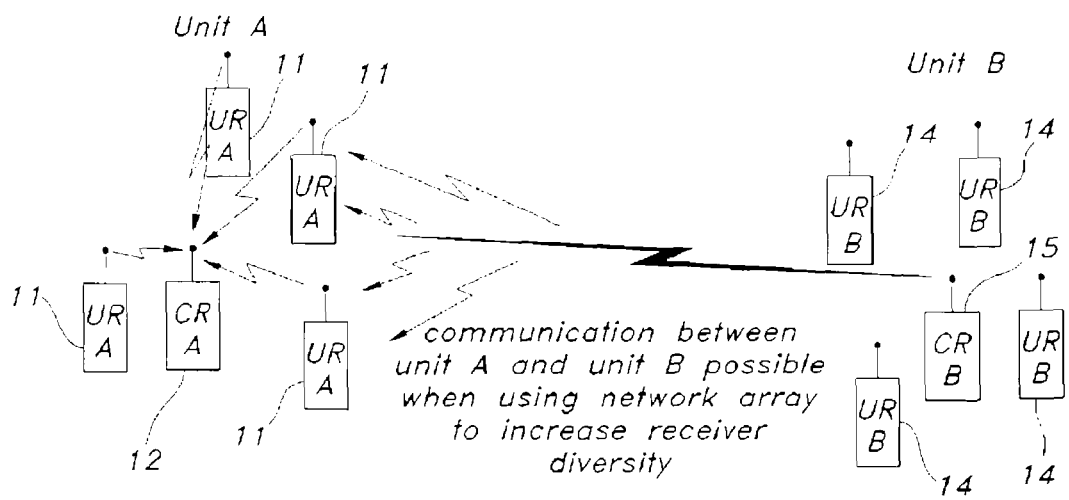
FIG. 1b shows an embodiment where multi-wavelength separation of unit radios within a unit is implemented to form a network array to harness the collective receiver capabilities of a unit.

In a first embodiment, multi-wavelength separation of unit radios within a unit is implemented as depicted in FIG. 1b to form a network array for the special case of MIMO referred to as single-input multiple-output (SIMO). If the commanders are able to harness the collective receiver capabilities of their respective unit, the diversity gain is sufficient to establish LPI/LPD communications. In FIG. 1b radio CRB 15 is transmitting from unit B to unit A. Some of the radios URA 11 receive the signal from CRB 15 while CRA 12 does not. With MIMO, multiple radios in unit B are transmitting and multiple radios in unit A are receiving.

It is not necessary that the radios URA 11 and URB 14 be accompanied by a soldier. It is possible to scatter radios URA 11 and URB 14 over an area possibly too dangerous for soldiers by air drops, placing the radios manually and quickly leaving the area or any other means and to make use of the radios URA 11 and URB 14 from a remote command radio CRA 12 and CRB 15 in a more secure location. Also, given the location of each unit radio is known, time of arrival and triangulation may be used to determine the location of a transmitting source.

In FIG. 1b radios URA 11 that receive signals from CRB 15 send the received signals to the command radio CRA 12 for processing. The received signals sent from the radios URA 11 to the command radio CRA 12 may be baseband samples or soft decisions on the received signals from CRA 12. Reporting soft decisions on received symbols or bits rather than baseband samples requires less bandwidth and no equalization of phase and gain or synchronization of sample clocks in the receivers of radios URA 11. However, digital beam forming techniques cannot be applied to the soft decisions.

Having radios URA 11 report soft symbol decisions, rather than baseband samples, provides some alternatives. Although reporting soft symbol decisions may limit processing options at command radio CRA 12, it reduces the bandwidth of data reported back to CRA 12 and relaxes synchronization requirements among radios URA 11. With each individual URA 11 calculating its own soft symbol decisions, the processing requirements on CRA 12 are reduced. In addition to soft symbol information, radios URA 11 may convey additional information to CRA 12 that may assist in combining soft symbols such as SINR (ratio of the desired received signal strength to the undesired received, signals strength).

There are several options that may be considered for processing the received signals at the radio CRA 12. For example in a signal voting method, the command radio CRA 12 may listen to only the best signal received from any of the radios URA 11. This might be beneficial if one of the radios in the commander's unit A has a line-of-sight communications path with the command radio CRB 15.

Another approach, when using soft decisions, is to have the radio CRA 12 combine the signals received from the radios URA 11 and relayed to the radio CRA 12. A simple example is to perform a weighted sum of the signals arriving from radios URA 11. If three of the radios URA 11 report the symbol as a +1 and one radio reports the symbol as a −1, then combining the reports yields the result that the symbol is a +1.

Another example may be to draw on SIMO algorithms to take advantage of the multipath environment. If the transmit and receive radios both use network arrays, MIMO algorithms may be employed.

Figure 2:
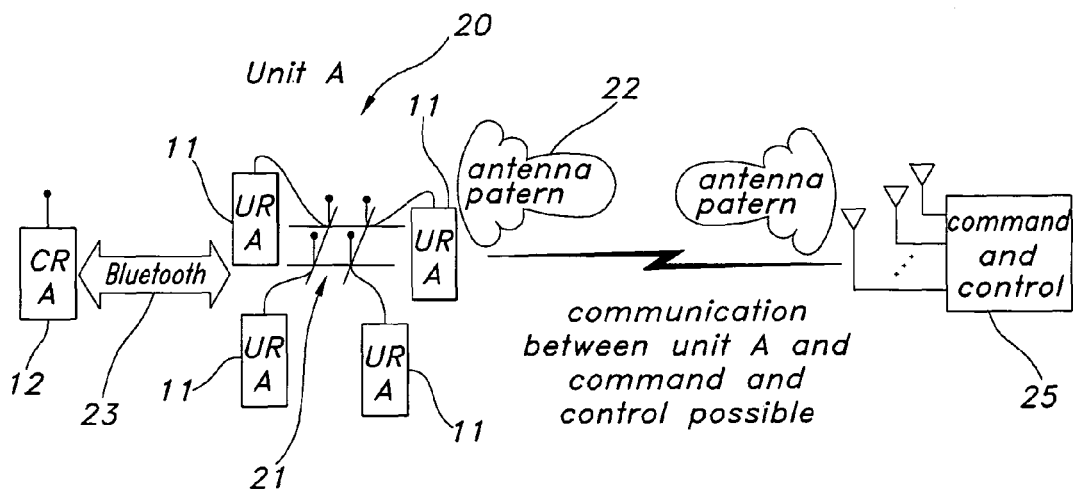
FIG. 2 shows an embodiment where a half-wavelength or less separation of unit radios is employed to form the network array as a digital beam forming antenna.

In another embodiment, shown in FIG. 2, a half-wavelength or less separation of radios URA 11 is employed to form the network array as a digital beam forming antenna 20 or a directional mobile ad-hoc network (MANET). Before setting out on a covert mission, unit A meets for final instructions. Unit members each connect their radio URA 11 to a collapsible antenna grid 21 set up to ensure half-wavelength or less spacing. After a brief calibration period to account for internal differences in front ends of radio transmitters and receivers in the radios URA 11, the radios URA 11 are able to function as the digital beam forming antenna 20 to form an antenna pattern 22. This digital beam forming antenna 20 is able to communicate with a command center 25 or another radio (not shown) that may be out of range for non-directional radios.

Synchronization of network array members is needed for proper functioning when using baseband samples. There are several synchronization issues to be addressed. Some of the synchronization issues depend on how the network array is to be used. Synchronization is needed for local oscillator and digital clocks or the radios and for network array transmissions.

Ideally, all radios in the network use a common local oscillator (LO) and an analog-to-digital converter/digital-to-analog converter (ADC/DAC) clock. In general, it is not practical to physically link the radios, although it may be possible in the scenario using radios URA 11 for DBF as shown in FIG. 2. An alternative is to use a common reference clock. If a GPS receiver (not shown) is available, one option is to use the GPS receiver to supply a one pulse per second clock or, possibly, a 10 MHz clock from the GPS receiver. A clock rate may be multiplied or divided to drive the LO and ADC/DAC digital clocks within the unit radios URA 11.

If GPS is unavailable, it may be possible to have stable reference clocks (not shown) in each radio URA 11 and to synchronize these references. The synchronization may be done once at the start of a mission if the radio clocks are stable enough to fly-wheel through the duration of the mission without correction. Another option may be for a periodic update from some network reference, possibly the command radio CRA 12. This may become more challenging when the unit radios' distance from the reference changes, unless the radios URA 11 can correct for the delay by knowing its distance from the reference.

Even with a common LO and digital clocks, some data structure for the network is probably required or helpful to determine frame timing. If the GPS clock is used, the one-second pulse may be part of the solution. If the radio clocks are fly-wheeling, they may require an initialization reference at the time they are synchronized to the other radios.

If the network array uses a time-based access structure, such as TDMA, an absolute clock may be used to determine frame and slot positions in time. The command radio CRA 12 may assign the time slots, but is not responsible for transmitting a sync signal to keep the radios URA 11 aligned. Generally, it may be expected that radios URA 11 of the network array are in reasonably close proximity, and that no correction (time advance/retard) is necessary to align the time-of-arrival at the command radio CRA 12. However, it may be feasible to make these types of time estimates given a common absolute clock.

Given the network array uses spread spectrum, it may be possible and advantageous to synchronize chip periods to reduce loss of orthogonality. Even when using spread spectrum, it can be expected that frame-based transmissions occur, and the common absolute clock may be beneficial. With a sufficiently high spreading code, it may be possible for all radios URA 11 to frame- and chip-align their response, and the command radio CRA 12 may collect the frame data from all the radios simultaneously, rather than using a TDMA structure and assigning slots to radios URA 11. If required, power control may be open or closed loop. Even in a closed loop, a format is required. It is not expected that the command radio CRA 12 do excessive analysis and control.

One option may be to use a separate link 23 (see FIG. 2) to send sampled baseband signals or soft decisions back to the command radio. CRA 12. Bluetooth technology is an example of a possible separate link 23. Given a fast enough separate link 23, the network array may be used to transmit and receive simultaneously.

In order for the command radio CRA 12 to configure the network array 20, it must communicate with the unit radios URA 11 and share data between networked radios. It also must be able to receive the baseband samples or soft decisions from the radios URA 11.

A challenge, due to potentially high bit rates, is to get the unit radios' baseband samples or soft decisions back to the command radio CRA 12. The data rate required depends on the baseband sample, rate, the number of bits per sample, the protection (encoding) required and how many unit radios URA 11 will send their data back to the command radio CRA 12.

Figure 3A:
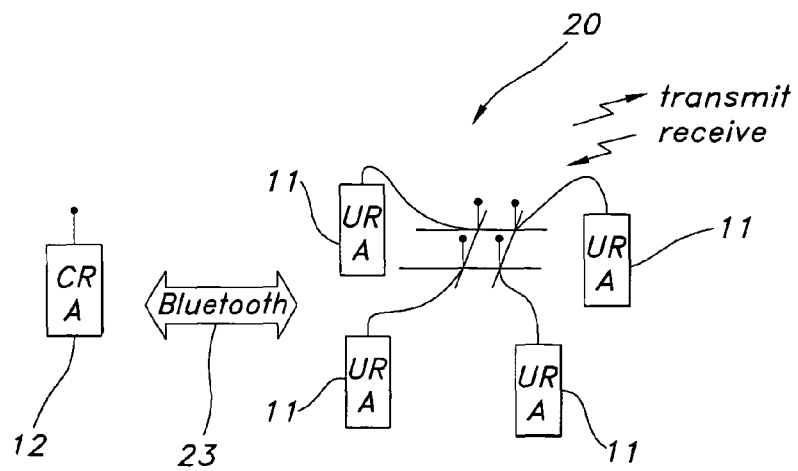
FIG. 3a shows an embodiment where the unit, radios must be able to simultaneously transmit and receive as the network array thereby requiring a separate link to the command radio.

Another issue is whether the unit radios URA 11 must be able to simultaneously transmit and receive as the network array 20. If the radios URA 11 must transmit and receive simultaneously, they may not be able to use the same transmitters/receivers for passing baseband or soft decision data back to the command radio CRA 12. In this case, the separate link 23 is necessary. This embodiment is shown in FIG. 3a as a network array for MIMO MANET.

Figure 3B:
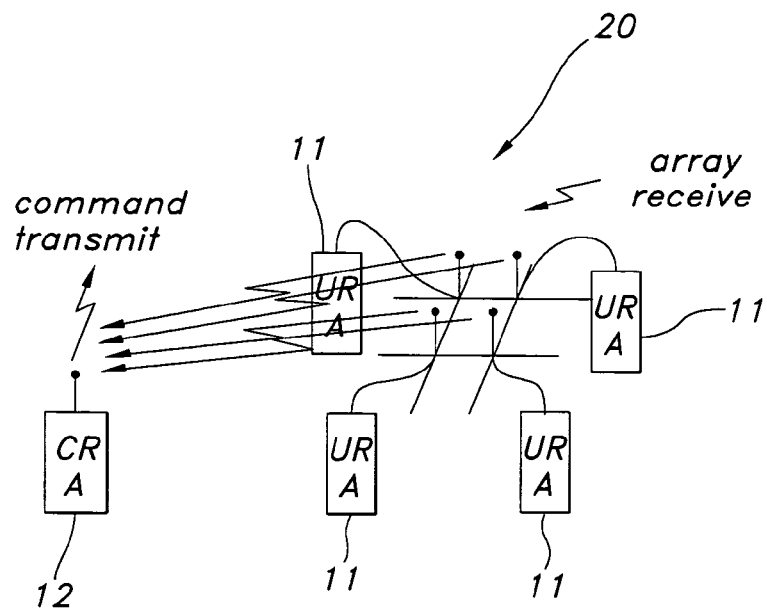
FIG. 3b shows a situation where the radios in the network array are only used for receiving and their transmitters are used to communicate with the command radio.

If the radios URA 11 in the network array 20 are only used for receiving, their transmitters may be able to pass back the baseband samples or soft decisions to the command radio CRA 12. In this case, either the command radio CRA 12 doesn't need to transmit, or it can use its own transmitter. This is shown in FIG. 3b.

Figure 3C:
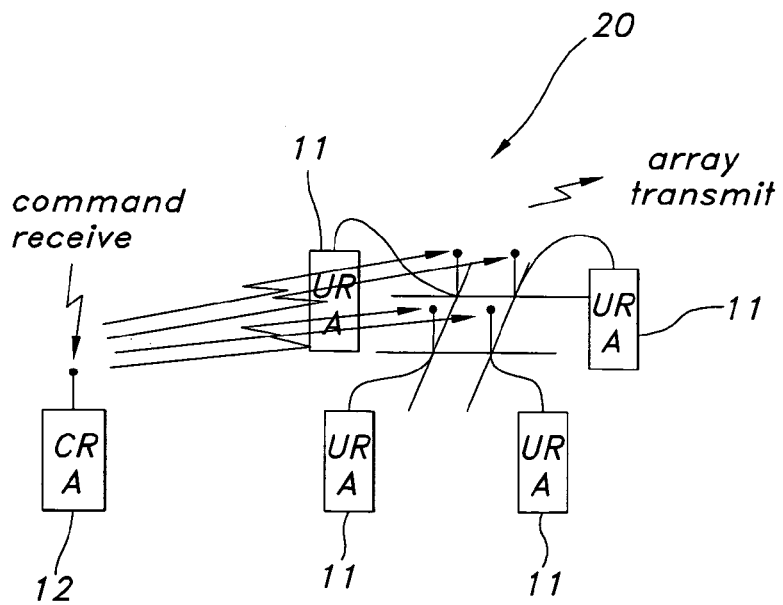
FIG. 3c shows a situation where the command radio only needs the network array to transmit and communicates with the unit radios that use their receivers to collect baseband samples or soft decisions and their transmitters to send them out from the network array.

Similarly, if the command radio CRA 12 only needs the network array 20 to transmit, it may send its baseband signals or soft decisions to the unit radios URA 11 that use their receivers to collect the baseband samples or soft decisions and their transmitters to send them out from the network array 20, as shown in FIG. 3c.

If the command radio CRA 12 is to be able to receive baseband data or soft decisions from multiple unit radios URA 11, it does not only have to receive this data, but process it using, for example, DBF or MIMO techniques. Depending on the processing, this may require capability that is beyond that of unit radios URA 11, that is, the command radio CRA 12 must have more processing capability than the unit radios URA 11.

In order to use an array for direction-finding, the array must correct for phase and gain inconsistencies of a radio receiver's front end processing. If the array is to be used to respond back in a given direction, or null a given direction, the radio transmitters must correct for the phase and gain inconsistencies.

When using an array with element separation of greater than half-wavelength, it is expected that the array is used for diversity reception, rather than DBF. In this case, the phase and gain differences of the front ends are less critical.

It is believed that the antenna array formed by a network of transceivers of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A network array comprising:
  a plurality of unit radios;
  a command radio located with the plurality of unit radios;
  wherein the plurality of unit radios and the command radio operate to form an antenna array;
  wherein the plurality of unit radios provide a plurality of respective signals for received signals and provide the respective signals to the command radio for combining the respective signals from the plurality of unit radios to provide a result signal,
  wherein synchronization is achieved using a GPS clock in the unit radios;
  wherein each radio in the plurality of unit radios is separated at greater than half-wavelength spacing and the command radio uses collective receiver capabilities of the plurality of unit radios to establish communications with another radio.

2. The network array of claim 1 wherein the command radio listens to a best signal received by a unit radio in the plurality of unit radios from the other radio.

3. The network array of claim 1 wherein the command radio combines the respective signals received by the plurality of unit using weighting.

4. The network array of claim 1 further comprising an antenna grid to which the plurality of unit radios are connected and that is set up for half-wavelength or less spacing of the plurality of radios.

5. The network array of claim 1 wherein the plurality of unit radios in the form a synchronized network array.

6. The network array of claim 5 wherein the plurality of unit radios are synchronized by having one of a common local oscillator and digital clock, a common reference clock, and stable reference clocks in the plurality of unit radios.

7. The network array of claim 5 wherein the network array is synchronized to determine frame timing with one of a common reference clock and stable reference clocks in the plurality of unit radios.

8. The network array of claim 1 further comprising a separate link for the unit radios to send the soft decisions to the command radio when the plurality of unit radios simultaneously transmit and receive signals to and from the network array.

9. The network array of claim 1 wherein the unit radios are only used for receiving signals sent to the network array and their transmitters are used to pass the soft decisions to the command radio.

10. The network array of claim 1 wherein the command radio sends its soft decisions to the plurality of unit radios that use their receivers to receive the soft decisions and their transmitters to send soft decisions from the network array.

11. A network array comprising:
  a plurality of unit radios and
  a command radio;
  wherein the plurality of unit radios and the command radio operate to form an antenna array;
  wherein the plurality of unit radios provide respective signals for received signals and provide the respective signals to the command radio for combining the respective signals received from the plurality of unit radios,
  wherein the unit radios are synchronized using a GPS clock;
  wherein each radio in the plurality of unit radios is separated at greater than half-wavelength spacing and the command radio uses collective receiver capabilities of the plurality of unit radios to establish communications with another radio.

12. The network of claim 11 further comprising an antenna grid, wherein the plurality of unit radios are connected to the antenna grid to ensure half-wavelength or less spacing of the plurality of radios.

13. The network array of claim 11 wherein the command radio configures a network array by communicating with the plurality of unit radios to send and receive soft decisions.

14. The network array of claim 13 further comprising a separate link for the unit radios to send the soft decisions to the command radio when the plurality of unit radios simultaneously transmit and receive.

15. The network array of claim 13 wherein receivers of the unit radios are only used for receiving signals in the network array and their transmitters are used to pass the soft decisions of the received signals to the command radio.

16. The network array of claim 13 wherein the command radio sends combined soft symbol decisions to the plurality of unit radios that use their receivers to receive the soft decisions and their transmitters or send the soft decisions from the network array.

17. The network array of claim 11 wherein when unit radios of the plurality of unit radios are separated at greater than half-wavelength spacing and the command radio uses collective receiver capabilities of the plurality of unit radios to establish communications with another radio.

18. The network array of claim 17 wherein the command radio listens to a best signal received by a unit radio in the plurality of unit radios from the other radio.

19. The network array of claim 17 wherein the command radio combines signals received by the plurality of unit radios from the other radio.

20. An antenna array formed by a network of transceivers, said antenna array comprising unit radios and
  a command radio,
  wherein the unit radios form elements of the antenna array and
  wherein the command radio configures the antenna array,
  wherein the unit radios provide respective signals for received signals to the command radio for combining the respective signals from the unit radios,
  wherein the unit radios are synchronized by a GPS clock;
  wherein each radio in the plurality of unit radios is separated at greater than half-wavelength spacing and the command radio uses collective receiver capabilities of the plurality of unit radios to establish communications with another radio.

21. The antenna array of claim 20 wherein when the unit radios form an antenna array having greater than half-wavelength spacing and said command radio receives signals from another radio by selecting the soft symbol decisions from the unit radio receiving a best signal from the other radio, relative to the signals received by the other unit radios.

22. The antenna array of claim 20 wherein when the unit radios form an antenna array having greater than half-wavelength spacing and said command radio receives signals from another radio by combining signals from several unit radios, the signals received from the other radio.

23. The antenna array of claim 20 wherein when the unit radios form an antenna array having half-wavelength or less spacing, said antenna array forms a digital beam forming antenna and said antenna array further comprising an antenna grid to which the unit radios are connected.

24. The antenna array of claim 20 further comprising a separate link for the unit radios to send and receive the soft symbol decisions to and from the command radio when the unit radios simultaneously transmit and receive signals.

25. The antenna array of claim 20 wherein the receivers of the unit radios are only used for receiving signals and their transmitters are used to send the soft symbol decisions to the command radio.

26. The antenna array of claim 20 wherein the command radio sends its combined soft symbol decisions to the unit radios and the unit radios use their transmitters to send the soft symbol decisions.

27. The antenna array of claim 20 wherein when the unit radios are configured to form an antenna array having greater than half-wavelength spacing, said antenna array forming a digital beam forming antenna.

\* \* \* \* \*